J. BERG.
KITCHEN SINK.
APPLICATION FILED MAR. 17, 1913.
1,083,583.
Patented Jan. 6, 1914.
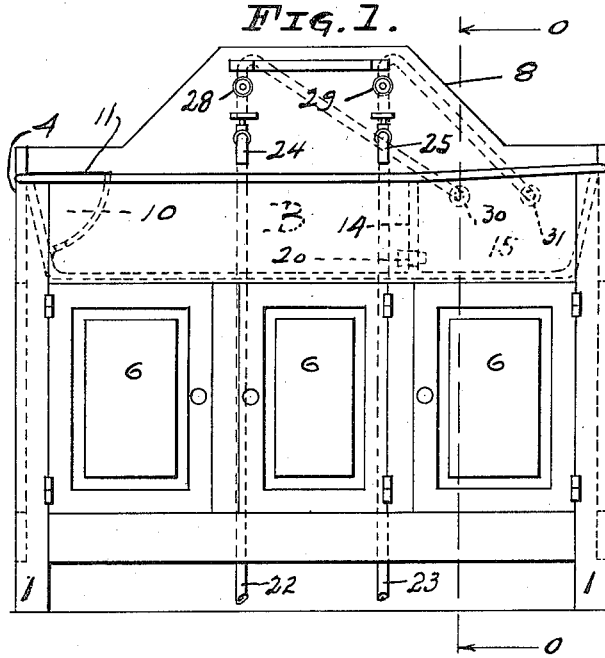
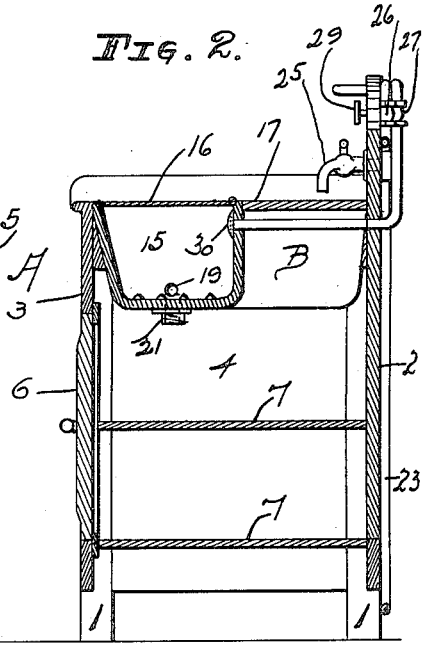
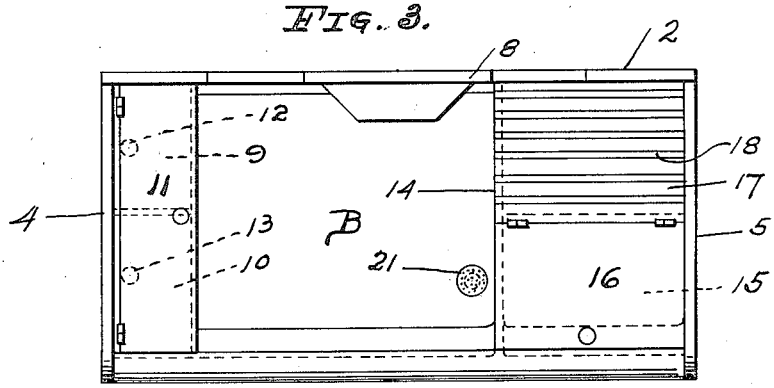
Witnesses:
Inventor
John Berg.

UNITED STATES PATENT OFFICE.

JOHN BERG, OF CHICAGO, ILLINOIS.

KITCHEN-SINK.

1,083,583.　　　　　　Specification of Letters Patent.　　Patented Jan. 6, 1914.

Application filed March 17, 1913. Serial No. 754,990.

*To all whom it may concern:*

Be it known that I, JOHN BERG, a citizen of the United States, and a resident of West Pullman, Chicago, Cook county, Illinois, have invented certain new and useful Improvements in Kitchen-Sinks; and I do hereby declare that the following description of my said invention, taken in connection with the accompanying sheet of drawings, forms a full, clear, and exact specification, which will enable others skilled in the art to which it appertains to make and use the same.

This invention has general reference to improvements in kitchen sinks, and it consists, essentially, in the novel and peculiar combination of parts and details of construction, as hereinafter first fully set forth and described and then pointed out in the claims.

In the drawing already referred to, which serves to illustrate my said invention more fully, Figure 1 is a front elevation of a cabinet showing my kitchen sink. Fig. 2 is a vertical, transverse section in line O O of Fig. 1, and Fig. 3 is a plan thereof, the piping and valves employed in the device not being shown in said plan.

Like parts are designated by corresponding characters or symbols of reference in all the figures of the drawing.

The object of this invention is the production of a neat and serviceable kitchen sink in which the bowl proper of the sink possesses compartments for soap and for refuse, and, also, a separate receptacle or auxiliary bowl, properly piped for hot and cold water service, which is intended for the reception of dishes while the same are being washed.

A in the drawings represents the cabinet hereinbefore mentioned and B my bowl in its entirety. The cabinet A is composed of four upstanding posts 1, a back 2, front 3, and sides 4 and 5. The front 3 is possessed of a series of hinged doors 6 to afford access to the interior of the cabinet, which interior has a plurality of shelves 7 for the reception thereon of pots, pans, or other utensils.

The bowl B is supported between the front and rear walls 2 and 3 and the sides 4 and 5, at the upper edges thereof, said back 2, however, extending above said bowl B at 8, as hereinafter described. The said bowl is essentially rectangular in plan, and has along one of its end walls integrally formed pockets 9 and 10, which pockets are possessed of a common, hinged cover 11, closing the open tops thereof. Said pockets are provided for the purpose of affording a container for soap and another for kitchen refuse or garbage, respectively, and both have openings 12 and 13, communicating with bowl B, so that any contained water may flow therefrom into said bowl. On the opposite end wall 14 of the bowl is formed an integral, rectangular auxiliary bowl 15, the width of which is approximately one-half that of the bowl B, as seen in Fig. 2. This bowl is closed by a hinged cover 16, and in the remaining space between the same and the back 2, there is located a drain board 17, having drain grooves 18. Bowl 15 has an outlet 19, discharging into the bowl B, which outlet is adapted to be closed by stopper 20. Bowl B is provided with a waste opening 21, to which a suitable waste pipe (not shown) may be screwed or clamped.

Located at the rear of back 2 are upwardly extending hot and cold water pipes 22 and 23, which are in direct connection with faucets 24 and 25, located on the face of the upward extension 8 of said back. Above the point of connection with said faucets, said pipes are provided with valves 26 and 27, the handles 28 and 29 of which are located adjacent the face of extension 8, directly above the faucets 24 and 25. Above these valves, said pipes are bent in a downwardly direction and extend along the rear of the back 2 to a point opposite the auxiliary bowl 15, where they are turned outwardly, finally terminating in rose nozzles 30 and 31 within said auxiliary bowl, thereby providing for a supply of hot and cold water to the same.

Attention is now called to the fact that the bowl B with its pockets 9 and 10 and the auxiliary bowl 15 may be produced integrally in the process of casting and enameled white. The cabinet proper may be manufactured from sheet metal, if desired, and similarly enameled, the whole producing a singularly sanitary piece of kitchen furniture which may be produced complete in the factory and delivered ready for connection with the water and waste pipes in the house without disturbing the plaster or walls of the kitchen.

Having thus fully described my invention, I claim as new and desire to secure to my- self by Letters Patent of the United States:—

1. An article of the class described comprising a suitably mounted, essentially rectangular bowl, integrally formed pockets along one of the ends of the said bowl, said pockets having outlets communicating with said bowl, a common hinged cover for said pockets, an integrally formed auxiliary bowl along the opposite end of said first named bowl, said auxiliary bowl being of lesser width than said first named bowl, and a cover for said auxiliary bowl, there being an outlet from said auxiliary bowl to said first named bowl.

2. An article of the class described comprising a suitably mounted essentially rectangular bowl, integrally formed pockets along one of the ends of the said bowl, said pockets having outlets to said bowl, an integrally formed auxiliary bowl along the opposite end of said first named bowl, said auxiliary bowl being of lesser width than said first named bowl, and a drain board located adjacent said auxiliary bowl and along the said end of the first named bowl, the width of said auxiliary bowl and said drain board being collectively equal to the width of said first named bowl.

3. A kitchen sink comprising an essentially rectangular bowl, integrally formed pockets along one of the ends of the said bowl, and an integrally formed auxiliary bowl along the opposite end of said bowl, said auxiliary bowl being of lesser width than said first named bowl, there being outlets from said pockets and said bowls.

In testimony whereof I have hereunto set my hand in the presence of two subscribing witnesses.

JOHN BERG.

In the presence of—
 WILLIAM O. STARK,
 W. HARDING.